United States Patent Office 2,910,575
Patented Oct. 27, 1959

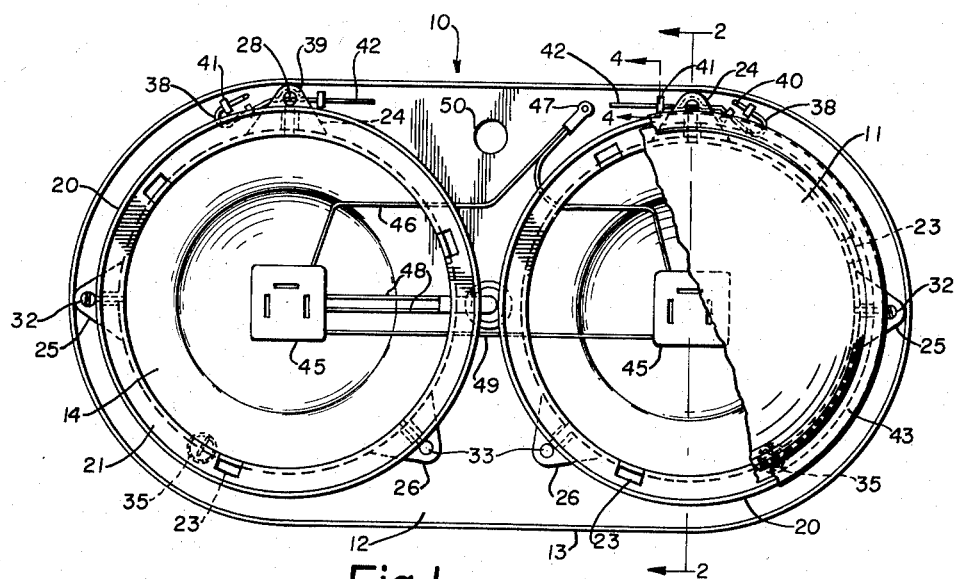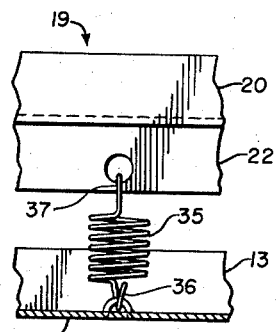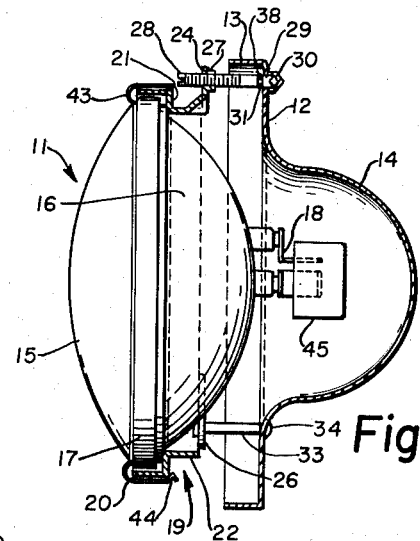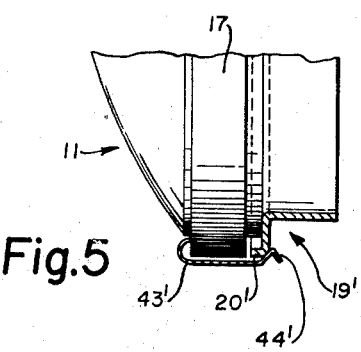

2,910,575

LAMP CONSTRUCTION

Kurt H. Meschwitzer, North Olmstead, and George H. Schofield, Lakewood, Ohio

Application February 7, 1957, Serial No. 638,867

7 Claims. (Cl. 240—41)

This invention relates to lamp construction and more particularly to improvements in sealed-beam lamps, such as those now commonly used as headlights in motor vehicles.

It is a primary object of the invention to provide a lamp of the sealed-beam type of such simplified construction as to comprise fewer parts than conventional lamps on the same general order whereby considerable reduction in the labor and cost of manufacture is realized. In thus distinguishing similar lamps made heretofore in the number and kind of parts required for a complete operative assembly, our new lamp is notable for its elimination of the nest usually employed to receive and mount the sealed-beam lamp.

Another object of our invention is to provide such a lamp in which the direction of the light beam relative to the structure in which the lamp is mounted, for example, an automobile, can readily be adjusted by positive action, with the assembly being so constructed that any selected condition of adjustment is firm and maintained despite considerable jarring and vibration, such as the unit would encounter in use as an automobile headlight.

It is also an object of the invention to provide a lamp of this nature in which the sealed-beam bulb is insertable and removable by an extremely easy and quick operation, thus facilitating initial assembly and subsequent replacement of the bulb.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a front elevational view of a dual lamp constructed in accordance with the present invention;

Fig. 2 is a vertical section as viewed from the plane of the line 2—2 on Fig. 1;

Fig. 3 is a fragmentary view showing in elevation and on an enlarged scale a detail of the assembly;

Fig. 4 is a section taken on the line 4—4 in Fig. 1; and

Fig. 5 is a partial side view illustrating a modification of the assembly.

Referring now to the drawings in detail, the assembly shown in Fig. 1 is a dual sealed-beam unit intended for recess mounting as for example in the front panel of an automobile for headlight use. Such unit comprises a body or shell designated generally by reference numeral 10 which is of general oval shape and otherwise so formed to receive and support two sealed-beam lamp bulbs, one of which is indicated at 11. The shell may of course be arranged with its longer axis either vertical or horizontal, depending on whether the lights are to be one above the other or side-by-side.

The shell 10 has a floor or deck 12 bounded by a forwardly projecting flange 13 and formed with two rearwardly protruding, generally spherical cavities 14. The latter are spaced apart and adapted partially to receive and enclose the inner ends of the bulbs 11. The two bulbs are supported by the shell in identical manner and it will accordingly suffice to consider and describe in detail one half or side of the assembly.

The sealed-beam lamp bulb 11 is conventional and comprises a lens section 15 and a combined filament-reflector section 16. The two sections are so joined as to have a common envelope, with a peripheral boss forming a mounting ring 17 about the same at the largest diameter. Three terminals 18 project at the rear for connection of the filaments in the proper lighting circuits.

The bulb is fitted in a holder 19 in the form of a ring having an outer axially extending section 20, a radial wall 21, and an inner axial extension 22 of a smaller diameter than the outer section 20. Such holder is dimensioned so that the ring 17 on the bulb overlies the radial wall 21 and is surrounded in closely spaced relation by the outer holder section 20; extension 22 is large enough to pass the inner end of the bulb. Since the bulb usually has three protuberances about its periphery, the holder 19 is cut away at 23 to accommodate the same, such openings thereby serving to locate the bulb in the holder.

At three circumferentially spaced points, reinforced ears 24, 25 and 26 project radially outwardly from the inner end of the holder extension 22, with their tips or ends being beyond or outward of the holder section 20, as illustrated. The outer end portion of ear 24 is deformed locally to the rear to form an opening, at 27, which is internally threaded and has threaded therein an adjusting screw 28. The inner end or tip 29 of this screw is faceted, in the particular embodiment shown to pyramidal shape, and engaged in a socket 30 formed in the deck of the shell 10 with a corresponding contour. An annular groove 31 is provided in the screw approximately in the plane of the shell floor 12 for a purpose to be described.

An adjusting screw 32, which is the same as the screw 28 except that it lacks the annular groove of the latter, is similarly threaded through the ear 25 and engaged at its inner end in a recess formed and functionally cooperative in the same manner as the socket 30. The remaining ear 26 has a pin 33 passed through the same and staked therein to engage the floor 12 in a dimple 34. The two adjusting screws and such pin thus constitute three supports for the holder 19 on the shell 10 about the cavity 14 and spacing the holder outwardly of the shell. The holder is releasably secured to the shell in such spaced relation releasably by tension spring means and latch mechanism, the first comprising an axially oriented tension spring 35 connected at one end 36 to the shell floor 12 and at its other end 37 to the extension 22 of the bulb holder 19. Such spring is thus connected in the lower half of the assembly, between the ears 25 and 26, and is normally under tension, so that it tends to rock the holder 19 away from the shell in the upper portion of the former. The holder is latched against such rocking by a wire lock spring 38 having a loop portion 39 adapted to engage in the groove 31 formed in the top adjusting screw 28. One end 40 of the spring 38 is held in a hole provided therefor in the shell 10, while the body of the spring is held flat against the shell floor 12 by being hooked under tabs 41 punched out of the floor as shown most clearly in Fig. 4. End 42 of the spring wire is free and can readily be moved to lift the loop portion 39 from the groove in the adjusting screw 28, when it is desired to remove the holder from the shell.

The bulb must of course be attached to the holder and for such purpose we have shown, in Fig 2, a retaining ring 43 having a turned front edge which engages against the front face of the bulb ring 17. Such retaining ring embraces the outer section 20 of the holder and is formed with a plurality of spring clips 44 to engage behind the latter. Such clip fasteners, which may vary in number about the retainer, provide a snap action assembly of the parts.

In Fig. 5, we have shown a slightly different form of bulb holder 19' having a reduced forward end section 20' which is to the rear of the bulb ring 17, rather than disposed about the same. Here the retainer ring 43' overlies both the bulb ring 17 and the section 20', but the clamping is accomplished in the same manner by a plurality of clip fasteners 44'.

In the complete dual lamp assembly now, an electrical socket 45 is provided in each cavity 14, loosely therein, for engaging on the terminals 18 of the two bulbs. Ground wires 46 extend from the sockets to an electrical connection 47 on the shell, while suitable lead-in and bridge wires 48 and 49 respectively establish suitable circuits for energizing the bulbs in the particular lighting system in which they are used. Such connections can of course be varied to meet particular desired conditions and in the unit shown, designed for automotive use, the shell is provided with an upper opening 50 suitable for reception of an auxiliary light, for example, a parking light.

The manner of inserting and removing the bulbs, and the ease with which this may be accomplished, will be obvious from the foregoing. It will likewise be appreciated that the adjusting screws 28 and 32 are accessible from the front of the assembly, whereby they may conveniently be actuated to alter the axis of the bulb and hence the direction of the beam. Screw 28 being at the top provides an adjustment the major effect of which is to move the upper part in and out, while the 90° displaced screw 32 moves the bulb about a generally vertical axis. In terms of actual in and out movement of the screws, the adjustment is quite small and the play in the wire latch spring 38 is enough to accommodate such movement of the screw 28.

The cooperable formation of the adjusting screws and the sockets of the holder in which they are engaged provides a very firm holding of the screws in given positions of rotative adjustment which, for all practical purposes, precludes an accidental shift in position. The possibility of loss of adjustment is negligible, notwithstanding jolting of the assembly and prolonged subjection to vibration.

Other modes of applying the principle of the invention may be employed, change being made as regards the details described, provided the features stated in any of the following claims or the equivalent of such be employed.

We, therefore, particularly point out and distinctly claim as our invention:

1. A lamp adapted for automotive headlight use, comprising a support shell defining a cavity bounded by a substantially planar surface, a holder adapted to receive and support a sealed-beam lamp bulb, said holder being in the form of a circular band having one end adjacent said shell about the cavity thereof, a tension spring connected to said holder at one point about its periphery and to the shell tending to draw the former at such point toward the latter, rigid spacer members carried by the holder and projecting into contact with the boundary surface of the shell, one of said members being generally opposite to the point of connection of the spring to the holder, latch means on the shell engaging and releasably holding such one spacer member against the spring tension on the holder, the other of said spacer members being spaced circumferentially of the ring between such one member and the spring rigidly supporting the latched holder in a plane spaced outwardly of the shell surface, and means for so adjusting such spacing as to vary the disposition of the plane of the holder relative to that of such shell surface.

2. In a lamp unit including a sealed-beam bulb having a mounting ring thereabout, a holder for such bulb in the form of a generally cylindrical member of short axial extent, said holder having a substantially radial wall against which the mounting ring of the bulb is abutted, a snap-action retainer ring engaged about the bulb at the mounting ring thereon and said holder serving to secure the former to the latter, said retainer ring being of larger diameter than the holder and disposed about the latter with its forward edge turned inwardly against the front end of the bulb mounting ring and integral spring fingers at its rear edge engaged behind the radial wall of the holder, a housing behind said holder enclosing the inner end of the bulb, means spacing the holder forwardly of and out of contact with the housing, and means for releasably mounting said holder on the housing in such outwardly spaced relation.

3. In a sealed-beam automotive headlight, a holder for the bulb thereof which engages about the periphery of such bulb, a housing within which the inner end of the bulb is received, plural rigid elements projecting from about the holder into contact with the housing and supporting the former in a plane outward of the housing, a spring connected between said holder and housing exerting a force which tends to rock the holder on such support elements, latch means acting on the holder in opposition to such spring force, at least one of the support elements being an adjusting screw having a faceted inner end, and a correspondingly faceted socket formed in the housing to receive the inner end of such adjusting screw.

4. A lamp adapted for automotive headlight use, comprising a housing defining a recess and substantially planar boundary section, a ringlike holder disposed adjacent said boundary section and adapted to support a bulb having its terminal portion within such recess, a pair of rigid but adjustable spacer elements extending between said holder and boundary section at points on the former spaced approximately 90 degrees apart, a further rigid spacer element likewise extending between the holder and boundary section at a point on the holder so spaced relative to the points of engagement of said pair of adjustable spacer elements therewith that the several such elements cooperably position the holder in an outwardly spaced plane relative to the housing, and resilient means interconnecting the holder and housing tending to draw the same together and thus maintaining the two in such assembled relation, said pair of adjustable spacer elements being individually adjustable to vary the effective lengths thereof between the holder and housing with the two thus resiliently interconnected.

5. A lamp adapted for automotive headlight use, comprising a generally cylindrical holder adapted to mount a bulb oriented along the axis of the holder, three rigid spacer elements carried by said holder and projecting at one end thereof to form a three-legged support for the holder, two of said elements being spaced approximately 90 degrees apart and being of adjustable length, a housing against which said holder is disposed with said elements contacting a surface of the housing and thus spacing the holder outwardly therefrom, and resilient means interconnecting and urging the holder and housing together to secure the former to the latter while permitting relative shifting of the holder axis by adjustment of one or both of the two adjustable spacer elements.

6. A lamp as set forth in claim 5 wherein said means for resiliently interconnecting the holder and housing comprises a spring extending between the two and latch means acting in opposition thereto.

7. A lamp as set forth in claim 5 wherein said holder has a substantially radial wall for seating of a bulb mounting ring thereagainst and a bulb retainer ring is disposed about the holder with front and rear edge portions turned inwardly respectively at the forward edge of the holder and at the rear of such radial wall thereof.

References Cited in the file of this patent

UNITED STATES PATENTS

| | | |
|---|---|---|
| 2,092,648 | Jaffe | Sept. 7, 1937 |
| 2,219,143 | Wharam | Oct. 22, 1940 |
| 2,271,162 | Sorrell | Jan. 27, 1942 |
| 2,428,479 | Tsouros | Oct. 7, 1947 |